United States Patent [19]
Vengsarkar et al.

[11] Patent Number: 5,641,956
[45] Date of Patent: Jun. 24, 1997

[54] OPTICAL WAVEGUIDE SENSOR ARRANGEMENT HAVING GUIDED MODES-NON GUIDED MODES GRATING COUPLER

[75] Inventors: Ashish M. Vengsarkar, Berkeley Heights, N.J.; Vikram Bhatia; Jonathan A. Greene, both of Blacksburg, Va.; Kent A. Murphy, Troutville, Va.

[73] Assignees: F&S, Inc., Blacksburg, Va.; Lucent Technologies, Murray Hill, N.J.

[21] Appl. No.: 595,734

[22] Filed: Feb. 2, 1996

[51] Int. Cl.$^6$ ........................................ H01J 5/16
[52] U.S. Cl. ............................ 250/227.14; 250/227.24; 385/28
[58] Field of Search ................ 250/227.14, 227.16, 250/227.24, 227.11; 385/28, 37, 50, 32; 356/32; 73/760, 763, 773, 774

[56] References Cited

U.S. PATENT DOCUMENTS

| | | | |
|---|---|---|---|
| 4,229,067 | 10/1980 | Love | 385/28 |
| 4,725,110 | 2/1988 | Glenn et al. | |
| 4,806,012 | 2/1989 | Meltz et al. | 356/32 |
| 4,950,883 | 8/1990 | Glenn | 250/227.14 |
| 4,974,931 | 12/1990 | Poole | 385/28 |
| 4,996,419 | 2/1991 | Morey | 250/227.18 |
| 5,048,913 | 9/1991 | Glenn et al. | 385/37 |
| 5,430,817 | 7/1995 | Vengsarkar | 385/37 |

OTHER PUBLICATIONS

T. A. Tran et al., "Real-time immunoassays using fiber optic long-period grating sensors", *Biomedical Sensing, Imaging, and Tracking Technologies I*, Proceedings SPIE—The International Society for Optical Engineering, R.A. Lieberman et al., Eds., vol. 2676, Jan. 29–31, 1996, pp. 165–170.
A. M. Vengsarkar et al., "Long–period fiber gratings as band–rejection filters", *Journal of Lightwave Technology*, vol. 14, No. 1, Jan. 1996, pp. 58–65.

A. M. Vengsarkar et al., "Long–period fiber gratings as gain–flattening and laser stabilizing devices", *Tenth International Conference on Integrated Optics and Optical Fibre Communication*, vol. 5, Jun. 26–30, 1995, pp. 3–4.
A. M. Vengsarkar et al., "Long–period cladding–mode--coupled fiber gratings: Properties and applications", *1995 Technical Digest Series*, vol. 22, Sep. 9–11, 1995, pp. SaB2–1/10–SaB2–4/13.
A. M. Vengsarkar et al., "Long–period fiber gratings as band–rejection filters", *OFC '95*, Feb. 26–Mar. 3, 1995, pp. PD4–1–PD4–5.
V. Bhatia et al., "Optical fiber long–period grating sensors", *Lightnews*, Jan. 1995, pp. 6–11.
F. Bilodeau et al., "Efficient, narrowband $LP_{01} \leftarrow\rightarrow LP_{02}$ mode converters fabricated in photosensitive fibre: Spectral response", *Electronic Letters*, vol. 27, No. 8, pp. 682–684, Jan. 1991.
K. O. Hill et al., "Efficient mode conversion in telecommunication fibre using externally written gratings", *Electronics Letters*, vol. 26, No. 16, pp. 1270–1272, Aug. 1990.

*Primary Examiner*—Que Le
*Attorney, Agent, or Firm*—Joy L. Bryant

[57] ABSTRACT

An optical waveguide sensor arrangement for sensing at least one physical parameter is provided. This arrangement comprises an optical waveguide having guided modes, lossy non-guided modes, and a long period grating coupling the guided modes to the lossy non-guided modes wherein the long period grating produces a wavelength transmission spectrum functionally dependent on the physical parameter sensed. A source means provides light to the optical waveguide sensor and an optoelectronic detector, which is positioned in an operable relationship to the optical waveguide sensor, detects light transmitted through the optical waveguide sensor. Lastly, a processing means is attached to the optoelectronic detector for correlating the wavelength transmission spectrum with a numerical value for the physical parameter sensed. The physical parameters sensed by the optical waveguide sensor include: temperature, strain, shape, refractive index and corrosion.

10 Claims, 9 Drawing Sheets

OPTICAL WAVEGUIDE SENSOR ARRANGEMENT HAVING GUIDED MODES-NON GUIDED MODES GRATING COUPLER

FIELD OF THE INVENTION

The present invention relates to an optical waveguide sensor arrangement. In particular, it relates to an optical waveguide sensor arrangement which employs a long period grating to produce a wavelength transmission spectrum functionally dependent on the physical parameter sensed.

BACKGROUND OF THE INVENTION

Optical fiber sensors are finding increased applications in civil, industrial and military fields. These sensors offer a myriad of advantages over their pneumatic and electronic counterparts that include increased sensitivity, geometrical flexibility, miniaturization, immunity from electromagnetic interference and multiplexing capabilities. Fiber optic sensors can be in-line, such as modal sensors, or external to the fiber, like the extrinsic Fabry-Perot interferometric sensor. Due to the photorefractive effect, a number of novel, intrinsic refractive index grating-based sensors have been recently proposed and demonstrated. These types of sensor elements are fabricated by exposing an optical fiber to a pattern of light at a wavelength at which the fiber is photosensitive. The light pattern photoinduces a refractive index variation or grating with the same spatial profile as the light pattern. Such gratings can be classified as either long- or short-period gratings. In general, the periodicity of long-period refractive index gratings are much larger than the wavelength of the operating light source (50–1500 microns). This is in contrast to short-period gratings which have periods less than the wavelength of the operating light source. Photoinduced, short-period Bragg grating sensors with periods less than one micron (1 micron=$10^{-6}$ meter) have been widely demonstrated as strain and temperature sensors. These photoinduced Bragg gratings reflect light at a wavelength which depends upon the environmental parameter being measured. The light reflected from the grating remains in the core of the fiber as a guided, backward propagating mode and travels back within the fiber where it can be monitored remotely. Hence, either the reflection or the transmission spectrum of the short-period Bragg grating sensor can be used to monitor shifts in the wavelength of the reflected light in response to environment-induced changes in the periodicity of the grating.

A number of patents have been issued for short-period Bragg grating-based sensors and sensor systems. Meltz et al. (U.S. Pat. No. 4,806,012) disclose a distributed, spatially-resolving optical fiber Bragg grating strain gauge. This sensor comprises an optical waveguide including a core for carrying light injected at selected wavelengths. It is impressed and reflected with one or more periodic phase gratings for modifying the reflection and transmission of injected light at the position of said grating in response to conditions of local physical or thermal strain. The core contains a series of variable spacing Bragg reflection gratings written, impressed or otherwise applied by application of a variable two-beam ultraviolet interference pattern. A broad band light source is focused through the lens onto the exposed end of core. A beam splitter serves to direct the return beam from the core toward a suitable readout or spectrometer for analysis. Alternatively, a transmitted beam passing out of the end of the core could be analyzed. Glen (U.S. Pat. No. 4,950,883) discloses a fiber optic sensor arrangement having reflective gratings responsive to particular wavelengths. A multitude of fiber optic sensors are implemented on a single continuous optical fiber. A technique is provided for multiplexing the output of such sensors and for subsequent demultiplexing and evaluation to obtain independent measurements of each sensor's response in such a manner that each sensor is sensitive to even subtle changes in the parameter being monitored at the respective location of the body at which the sensing portion of the sensor is situated. Additional Bragg grating sensor-based patents include "Optical Waveguide Embedded Transverse Spatial Mode Discrimination Filter" (U.S. Pat. No. 5,048,913) by Glenn et al., "Method for Impressing Gratings within Fiber Optics" (U.S. Pat. No. 4,725,110) by Glenn et al., and "Distributed Multiplexed Optical Fiber Bragg Grating Sensor Arrangement" (U.S. Pat. No. 4,996,419) by Morey.

The salient features of the Bragg grating sensor is its short refractive index grating period which converts light traveling in the forward-propagating, guided fundamental mode to the reverse-propagating, fundamental guided mode. The light being converted between the forward and reverse-propagating modes remains in the core of the optical fiber where its interaction with the surrounding environment is minimal. In part, due to this minimal interaction with the surrounding environment, the strain, temperature, and refractive index sensitivity of short-period Bragg gratings sensors is relatively low. In contrast to short period Bragg gratings, we disclose a long period grating which couples light traveling in the guided modes to non-guided modes. The light contained in these non-guided modes interact with surface defects on the optical waveguide and is rapidly attenuated. These modes are therefore referred to as lossy. Hence, the object of our invention is to use a long period grating to convert light traveling in the guided modes of the optical waveguide to the lossy non-guided modes of the optical waveguide at one or more wavelengths determined by one or more environmental parameters being measured. As a result of the waveguide properties of the optical waveguide cladding being extremely sensitive to changes in the environment, such long period gratings have been found to provide higher sensitivity to environmental parameters than their short period Bragg grating sensor counterparts.

Mode conversion using long-period refractive index gratings have been previously demonstrated. Hill et al. ("Efficient Mode Conversion in Telecommunication Fibre Using Externally Written Gratings", *Electronics Letters*, Vol. 26, No. 16, pp. 1270–1272, Aug. 2, 1990) describe a photoinduced long-period grating used to convert light traveling in the forward-propagating fundamental guided mode to the forward propagating $LP_{11}$ guided mode of the fiber. Using mode filters, the authors were able to produce absorption dips in the transmission spectrum of the photoinduced grating at wavelengths at which the mode conversion occurred. Bilodeau et al. ("Efficient, Narrowband $LP_{01} \leftrightarrows LP_{02}$ Mode Converters Fabricated in Photosensitive Fibre: Spectral Response", *Electronics Letters*, Vol. 27, No. 8, pp. 682–684, Jan. 29, 1991) expanded on this concept by fabricating gratings using internal and external writing techniques to convert light traveling in the forward propagating fundamental guided mode to the forward propagating third order $LP_{02}$ guided mode of the fiber. As with Hill's long-period grating, mode filters were required to introduce loss dips in the grating transmission spectrum because the process of converting light from one guided mode of the fiber to another guided mode of the fiber does not inherently introduce loss dips in the transmission spectrum of the grating.

Vengsarkar (U.S. Pat. No. 5,430,817) discusses an optical fiber communication component consisting of a photoinduced long-period grating which converts light traveling in the forward-propagating guided mode of the fiber to forward-propagating, non-guided lossy cladding modes of the fiber. He proposes the device as a spectral shape shifter to flatten the gain spectrum of erbium-doped amplifiers, to perform spectral cleanup in wavelength-division multiplexed communication systems, and for stabilization of fiber lasers. The device is also proposed as an inexpensive wavelength shift detector for use with reflection-based optical fiber sensors, such as the photoinduced short-period Bragg grating sensor described earlier. In addition, Vengsarkar discloses an optical fiber sensing system having a source of optical energy, a length of optical fiber including a short period reflective sensing grating for reflecting light, a long period grating coupled to the fiber for receiving light reflected from the short period grating and a photodetector for detecting the intensity of light through the device.

An object of the present invention is to provide an optical waveguide sensor arrangement for sensing at least one physical parameter which does not require the use of a Bragg grating.

Another object of the invention is to provide an optical waveguide sensor arrangement which senses changes in at least one physical parameter which uses a long period grating to couple guided modes to lossy non-guided modes to produce a wavelength transmission spectrum functionally dependent on the physical parameter sensed.

SUMMARY OF THE INVENTION

By the present invention, an optical waveguide sensor arrangement for sensing at least one physical parameter is provided. This arrangement comprises an optical waveguide sensor having guided modes, lossy non-guided modes, and a long period grating coupling the guided modes to the lossy non-guided modes wherein the long period grating produces a wavelength transmission spectrum functionally dependent on the physical parameter sensed. A source means provides light to the optical waveguide sensor and an optoelectronic detector, which is positioned in an operable relationship to the optical waveguide sensor, detects light transmitted through the optical waveguide sensor. Lastly, a processing means is attached to the optoelectronic detector for correlating the wavelength transmission spectrum with a numerical value for the physical parameter sensed. The physical parameters sensed by the optical waveguide sensor include: temperature, strain, shape, refractive index and corrosion. When measuring strain and shape, the optical waveguide may be attached to a structure.

As an alternative means to measuring a plurality of physical parameters at one time, an arrangement comprising a plurality of optical waveguide sensors is provided. These optical waveguide sensors each have guided modes, lossy non-guided modes, and a plurality of long period gratings coupling the guided modes to the lossy non-guided modes wherein the long period gratings produce a wavelength transmission spectrum functionally dependent on the physical parameters sensed. A means for coupling the optical waveguide sensors in series is also provided along with a source means for providing light to the plurality of optical waveguide sensors. An optoelectronic detector is positioned in an operable relationship to the plurality of optical waveguide sensors wherein the optoelectronic detector detects light transmitted through the optical waveguide sensors. A demultiplexing means is coupled to the optoelectronic detector for discriminating amongst each of the light signals transmitted through the optical waveguide sensors. Lastly, a processing means is positioned in an operable relationship to the demultiplexing means wherein the processing means correlates the wavelength transmission spectrum with a numerical value for each of the physical parameters sensed.

DESCRIPTION OF THE PREFERRED EMBODIMENTS

Figure 1:
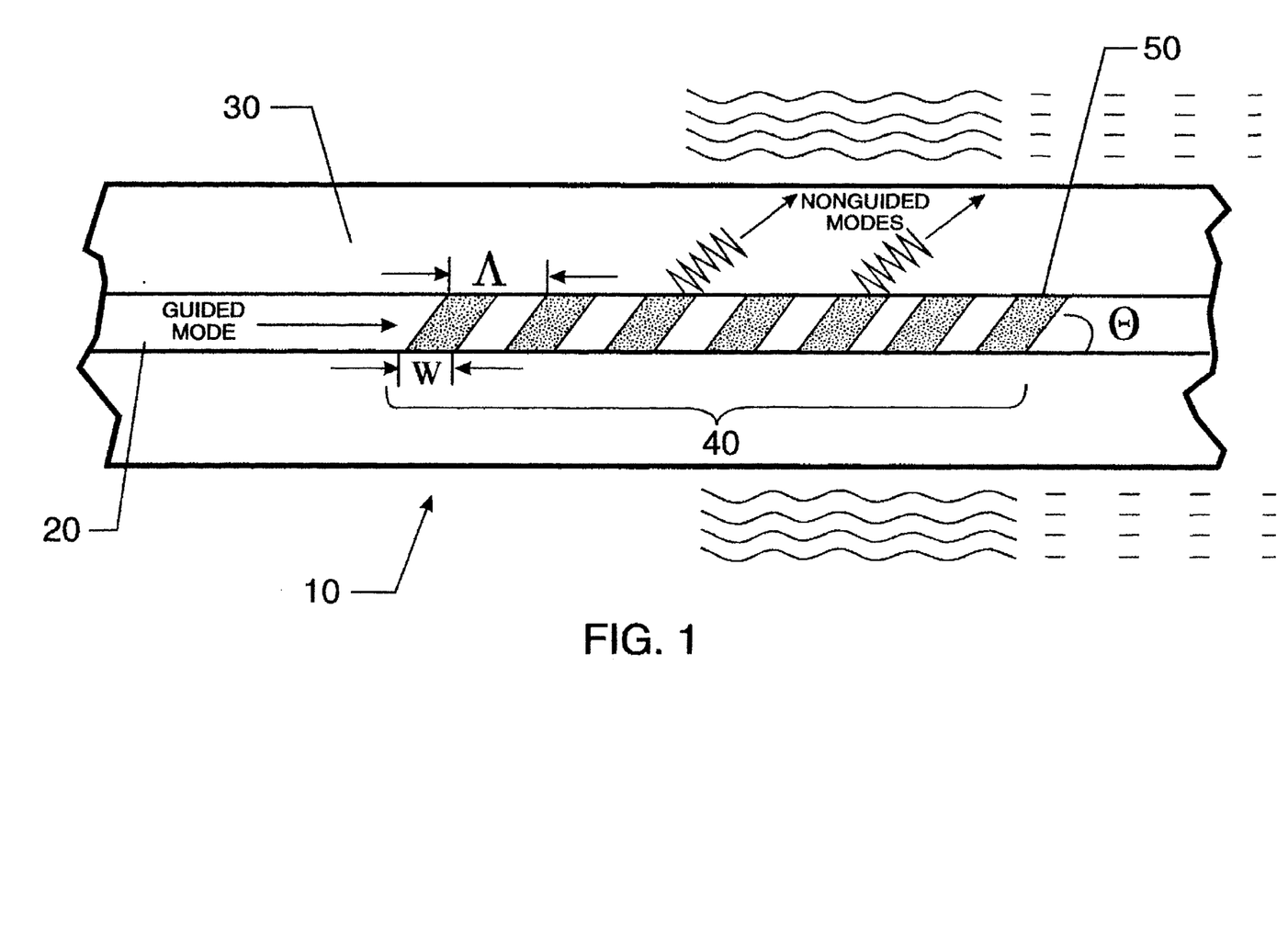
FIG. 1 is a schematic cross section of an optical waveguide sensor.

Referring now to the drawings. FIG. 1 is a schematic cross section of an optical waveguide sensor 10 comprising: a core 20 surrounded by a lower index cladding 30. The core 20 includes one or more long period gratings 40 each comprising a plurality of index perturbations 50 of width w spaced apart by a periodic distance $\Lambda$ where, typically 50 $\mu m \leq \Lambda \leq 1500$ $\mu m$. The perturbations are formed within the core of the waveguide and preferably form an angle $\theta$ with the longitudinal axis of the waveguide. The waveguide is designed to transmit broad band light of wavelength centered about $\lambda$. The spacing $\Lambda$ of the perturbations is chosen to shift transmitted light in the region of at least one wavelength from the guided mode into a lossy non-guided mode thereby reducing in intensity a band of light centered about a plurality of coupling wavelengths. The numerical values of the physical parameters sensed are determined by monitoring the wavelengths at which coupling occurs from the guided mode to the lossy non-guided mode.

Figure 2:
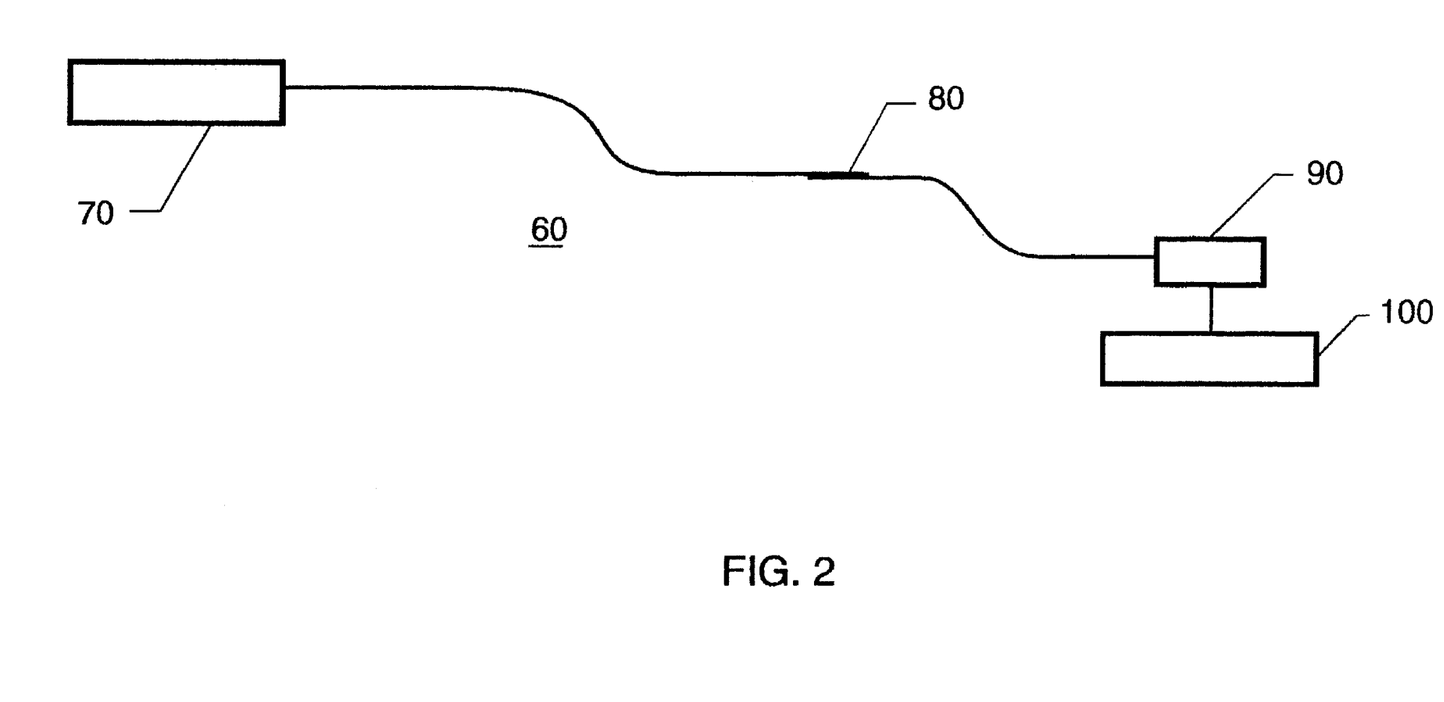
FIG. 2 is a diagram of a transmissive-based configuration of the optical waveguide sensor arrangement.

FIG. 2 is a transmissive-based configuration of the optical waveguide sensor arrangement. The optical waveguide sensor arrangement 60 comprises a source means 70 for providing light to an optical waveguide sensor 80. An optoelectronic detector 90 is positioned in an operable relationship to the optical waveguide sensor 80 wherein the optoelectronic detector detects light transmitted through the optical waveguide sensor 80 which produces a wavelength transmission spectrum functionally dependent on the physical parameter sensed. A processing means 100 is attached to the optoelectronic detector 90 for correlating the wavelength transmission spectrum with a numerical value for the physical parameter sensed.

Figure 3:
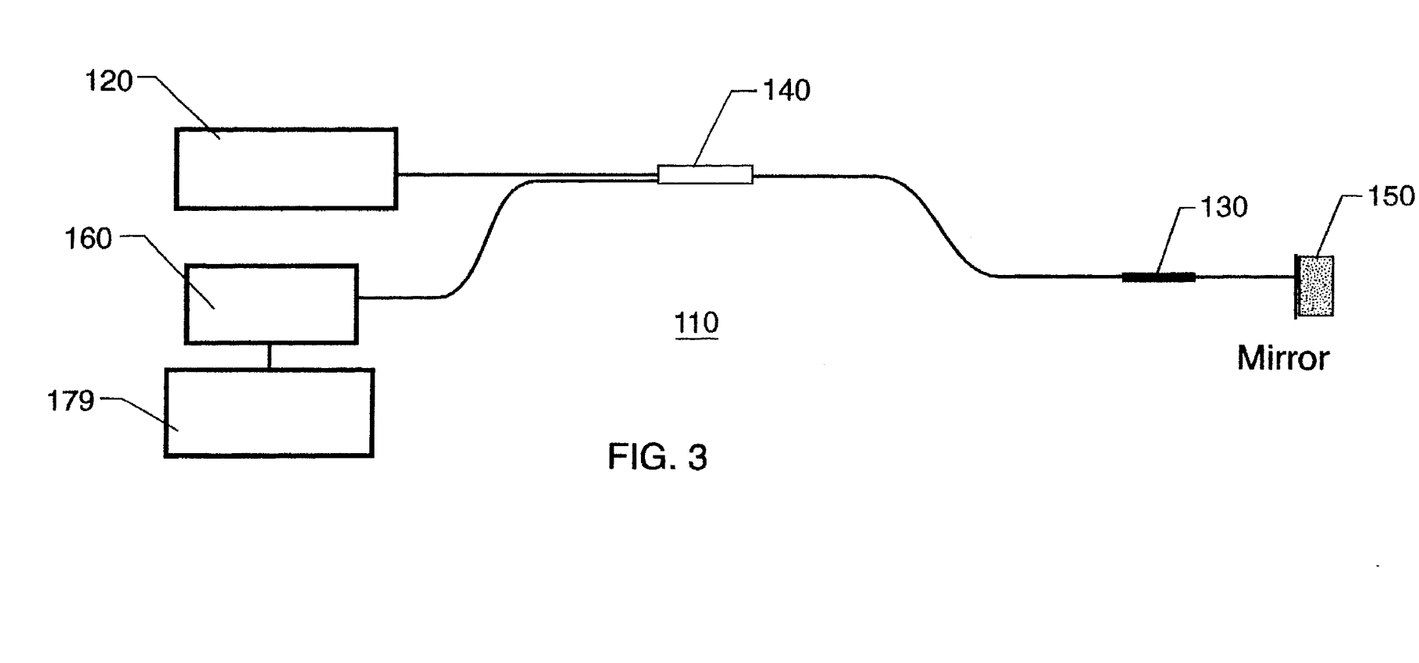
FIG. 3 is a diagram of a reflective-based configuration of the optical waveguide sensor arrangement.

FIG. 3 depicts a reflective-based configuration of the optical waveguide sensor arrangement 110. This arrangement comprises a source means 120 for providing light to an optical waveguide sensor 130. Light is transmitted to the optical waveguide sensor 130 by passing through a coupler 140. In this embodiment, the light passes through the optical waveguide sensor 130 and is reflected back through the optical waveguide sensor 130 by a mirror 150 positioned after the optical waveguide sensor 130. The reflected light then passes through the coupler 140 to an optoelectronic detector 160 which is attached to a processing means 170.

Figure 4:
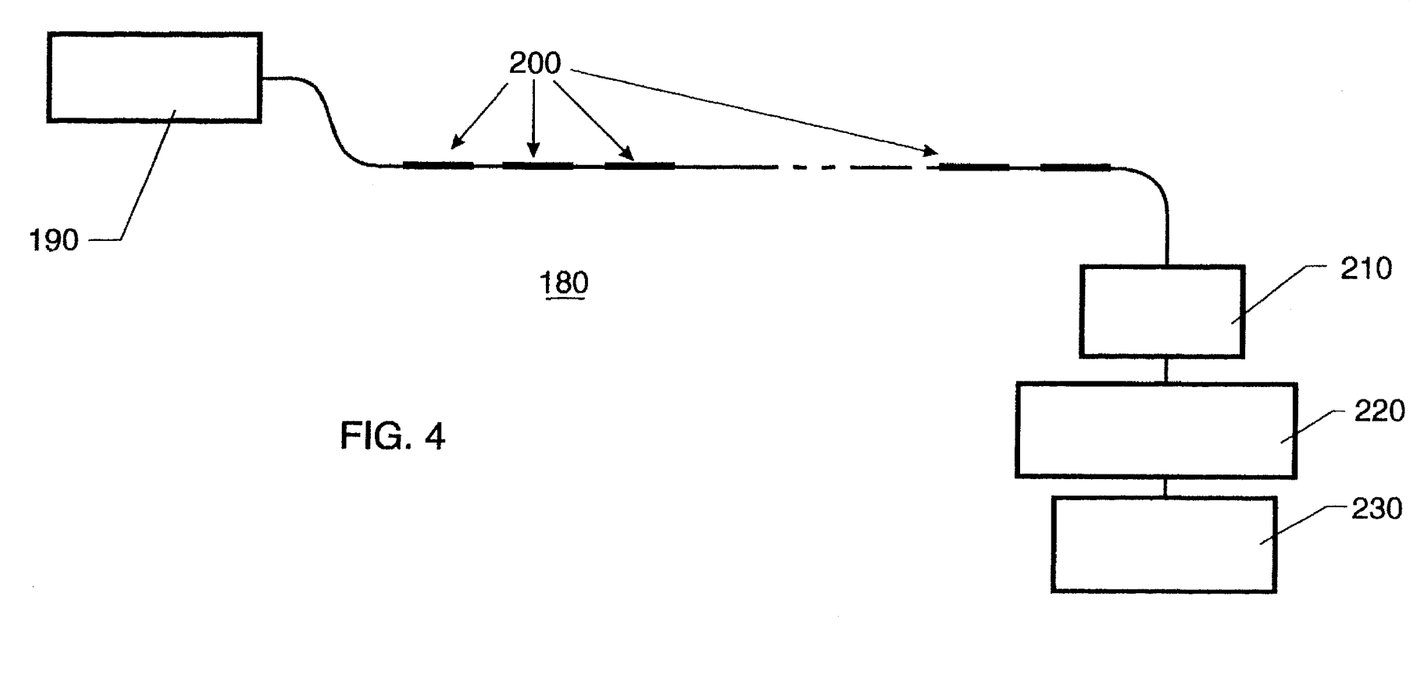
FIG. 4 is a diagram of a transmissive-based configuration of the optical waveguide sensor arrangement having a plurality of optical waveguide sensors.

FIG. 4 depicts an alternative embodiment, wherein a plurality of physical parameters may be sensed at one time using a modified arrangement 180. In this arrangement, a source means 190 provides light to a plurality of optical waveguide sensors 200 which have been coupled in series. An optoelectronic detector 210 is positioned in on operable relationship to the plurality of optical waveguide sensors 200 wherein the optoelectronic detector detects light transmitted through the optical waveguide sensors 200. A demultiplexing means 220 is coupled to the optoelectronic detector 210 for discriminating amongst each of the light signals returned from the optical waveguide sensors 200. A processing means 230, positioned in an operable relationship to the demultiplexing means, for correlating the wavelength transmission spectrum with a numerical value for each of the physical parameter sensed.

Fiber gratings are based on the Bragg phase-matching condition between the guided mode in the core and the non-guided modes or another guided mode in the core. For a single mode fiber with $\beta_g$ and $\beta_{ng}$ as the propagation constants of a forward-propagating guided mode in the core and a non-guided mode, the phase-matching condition becomes:

$$\beta_g - \beta_{ng} = \Delta\beta = 2\pi/\Lambda.$$

For conventional short-period fiber Bragg gratings, the coupling of the forward propagating $LP_{01}$ mode occurs to the reverse propagating $LP_{01}$ mode ($\beta = -\beta_{01}$). Since $\Delta\beta$ is large in this case, the grating periodicity is small, typically of the order of one micron. The long-period grating of the present invention couples a guided mode of the core to the non-guided lossy modes of the waveguide, resulting in smaller values of $\Delta\beta$ and hence larger periodicities. The nonguided modes attenuate rapidly as they propagate along the length of the fiber due to the lossy cladding-coating interface and bends in the fiber. Lossy is defined as light lost to the surrounding medium.

Figure 5:
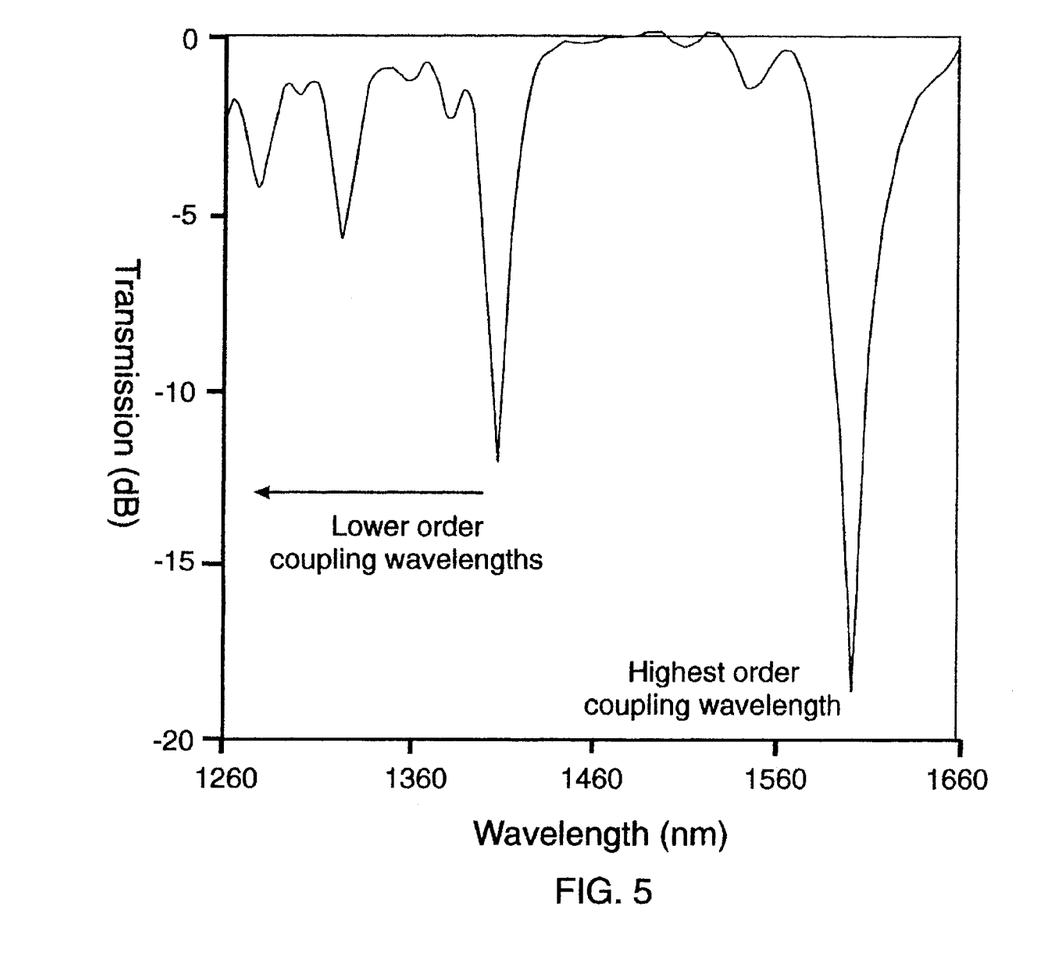
FIG. 5 is typical wavelength transmission spectrum for the optical waveguide sensor arrangement of the present invention.

Since $\Delta\beta$ can be discrete and a function of the wavelength, this coupling to the non-guided modes is highly selective, leading to a wavelength-dependent loss. As a result, it was discovered that any modulation of the guided mode of the core and the lossy non-guided modes of the cladding modifies the wavelength transmission spectrum produced by the long period grating. However, in order to obtain strong coupling between the guided mode of the core and the lossy non-guided modes of the waveguide, large refractive index changes are required. Practical long period grating based sensors can only be fabricated if a large refractive index change exists. Hence, the transmission spectrum of the long period grating consists of one or more dips, each corresponding to light coupled from the guided mode of the core to the lossy non-guided mode of the waveguide as shown in FIG. 5. Moreover, since the lossy cladding modes interact with the fiber jacket, or any other material surrounding the cladding, changes in the properties of the environment can also be detected. In contrast to short-period Bragg grating sensors, these long-period cladding mode-coupling gratings can therefore be used as very sensitive devices to detect strain, temperature, corrosion, refractive-index, and other physical parameters of the medium surrounding the optical fiber.

The optical waveguide sensors of the present invention may be any optical waveguide known to those skilled in the art such as an integrated optic sensor or a fiber optic sensor. As a preferred embodiment, the optical waveguide sensor is a fiber optic sensor. These sensors can be used for sensing any physical parameter but as a preferred embodiment, they can be used to sense temperature, strain, corrosion, shape and refractive index or any combination thereof. When sensing changes in shape, corrosion, or the strain of a material, the sensor can be attached to a structure and in particular it can be embedded in the structure.

The following examples illustrate the preparation and use of the optical waveguide sensor arrangement. These examples are merely illustrative and intended to enable those skilled in the art to practice the invention in all of the embodiments flowing therefrom, and do not in any way limit the scope of the invention as defined by the claims.

EXAMPLES

Fabrication of Long-Period Gratings

Hydrogen-loaded germanosilicate fibers were exposed to 248 nm UV radiation from a KrF excimer laser, through a chrome-plated amplitude mask possessing a periodic rectangular transmittance function to fabricate the long period grating sensors. The typical writing times for an energy of 100 mJ/cm$^2$/pulse and a 2.5 cm exposed length vary between six to eight minutes for different fibers. For coupling to the highest-order cladding mode, the maximum isolation (loss in transmission intensity) was in the 5 to 20 dB range on wavelengths depending on fiber parameters, duration of UV exposure and mask periodicity. The desired fundamental coupling wavelength can easily be varied by using an inexpensive amplitude mask of different period, $\Lambda$. The insertion loss, polarization-mode dispersion, back-reflection, and polarization-dependent loss of a typical long period grating were 0.2 dB, 0.01 ps, −80 dB and 0.02 dB respectively.

Example 1

Temperature sensitivity measurements were taken by placing the long-period, grating-based optical waveguide sensors in a thermocouple-monitored chamber. The shift in the coupling wavelength, $\lambda_p$, was monitored using an optical spectrum analyzer (OSA) while the gratings were held taut between two fibers to eliminate the effects of bends. The temperature-induced shift in the coupling wavelength of the long-period grating occurred due to a number of concurrent effects. First, the thermo-optic effect caused temperature changes in the refractive index of both the core and cladding of the fiber. In addition, a change in temperature caused the long-period grating to expand and contract, which in turn caused a change in the grating period. It was found that the coupling wavelength of the long-period grating was very sensitive to changes in the period of the grating. Finally, the diameter of the core and cladding of the long-period grating changed when the grating expanded and contracted through the Poisson effect. Small changes in the core and cladding diameter altered the effective refractive index of the core and cladding modes which in turn could be monitored as a shift in the coupling wavelength.

Figure 6:
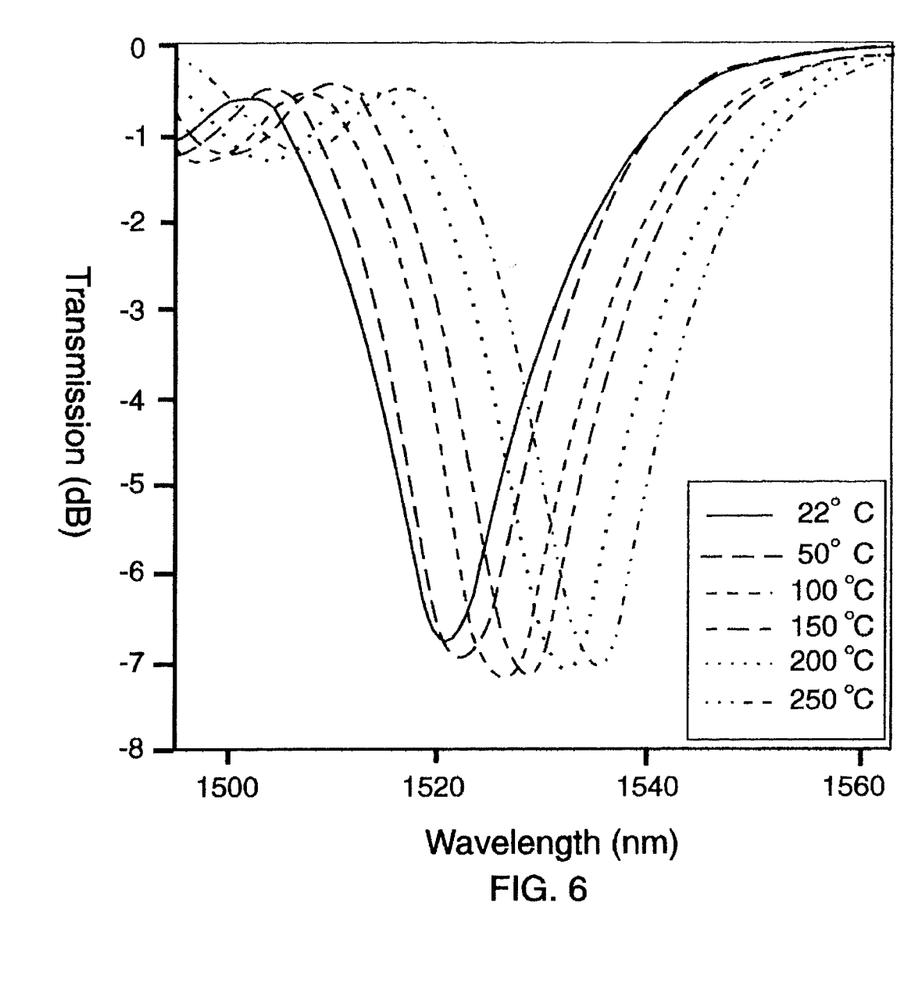
FIG. 6 is a plot of the shift in the peak loss wavelength as a function of the applied temperature.

Before performing the temperature sensitivity tests, the gratings were first annealed to 250° C. to prevent the effect of the decay of UV-induced defects from influencing the measurement process. For a single-mode fiber at a wavelength of 0.98 μm a temperature of 0.14 nm/°C. was obtained. The temperature sensitivity obtained using the long-period grating sensor was unexpectedly an order of magnitude larger than that obtained from short-period Bragg grating sensors (0.014 nm/°C.) at 1300 nm. Hence, for a given change in temperature, the wavelength dip in the transmission spectrum of a long period grating sensor shifted as much as ten times more than the wavelength dip of a short period fiber Bragg sensor. This transmission spectrum is shown in FIG. 6. As a result, less expensive wavelength shift detection instrumentation employing a long period grating based temperature sensing system could be used to obtain the same temperature resolution as a short-period fiber Bragg grating based temperature sensing system.

Example 2

Figure 7:
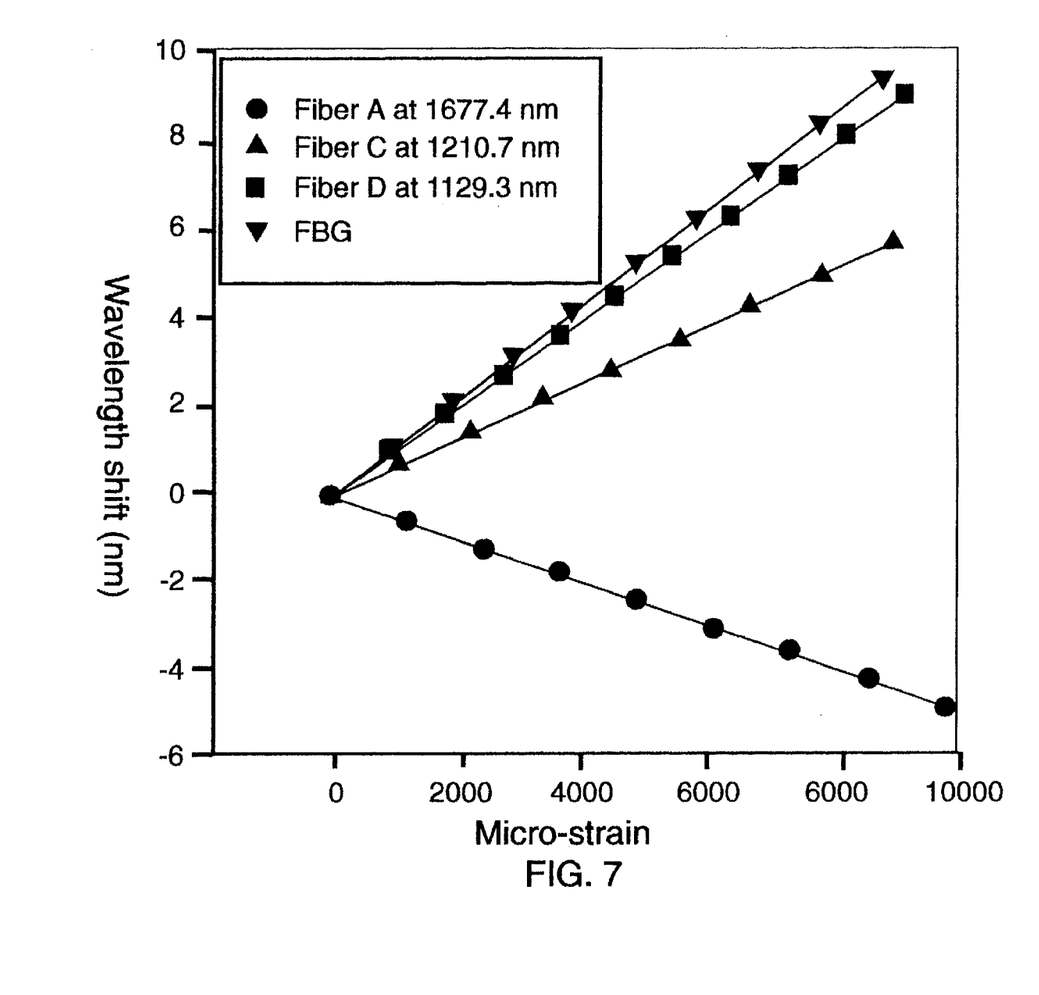
FIG. 7 is a plot of the shift in the peak loss wavelength as a function of the applied strain.

The strain sensitivity of long period gratings written in different fibers was analyzed by axially straining the gratings between two longitudinally separated translation stages. For a standard single-mode fiber at a wavelength of 1.3 μm the shift in coupling wavelength as a function of the applied strain was determined to be 50.9 nm/%$\epsilon$ ($\epsilon$=strain). The transmission spectrum is shown in FIG. 7. It was observed that the strain sensitivity obtained with this long-period grating is five times greater than the largest reported strain sensitivity for a short-period Bragg grating sensor (9 nm/% $\epsilon$ at 1.3 μm).

Example 3

Figure 8:
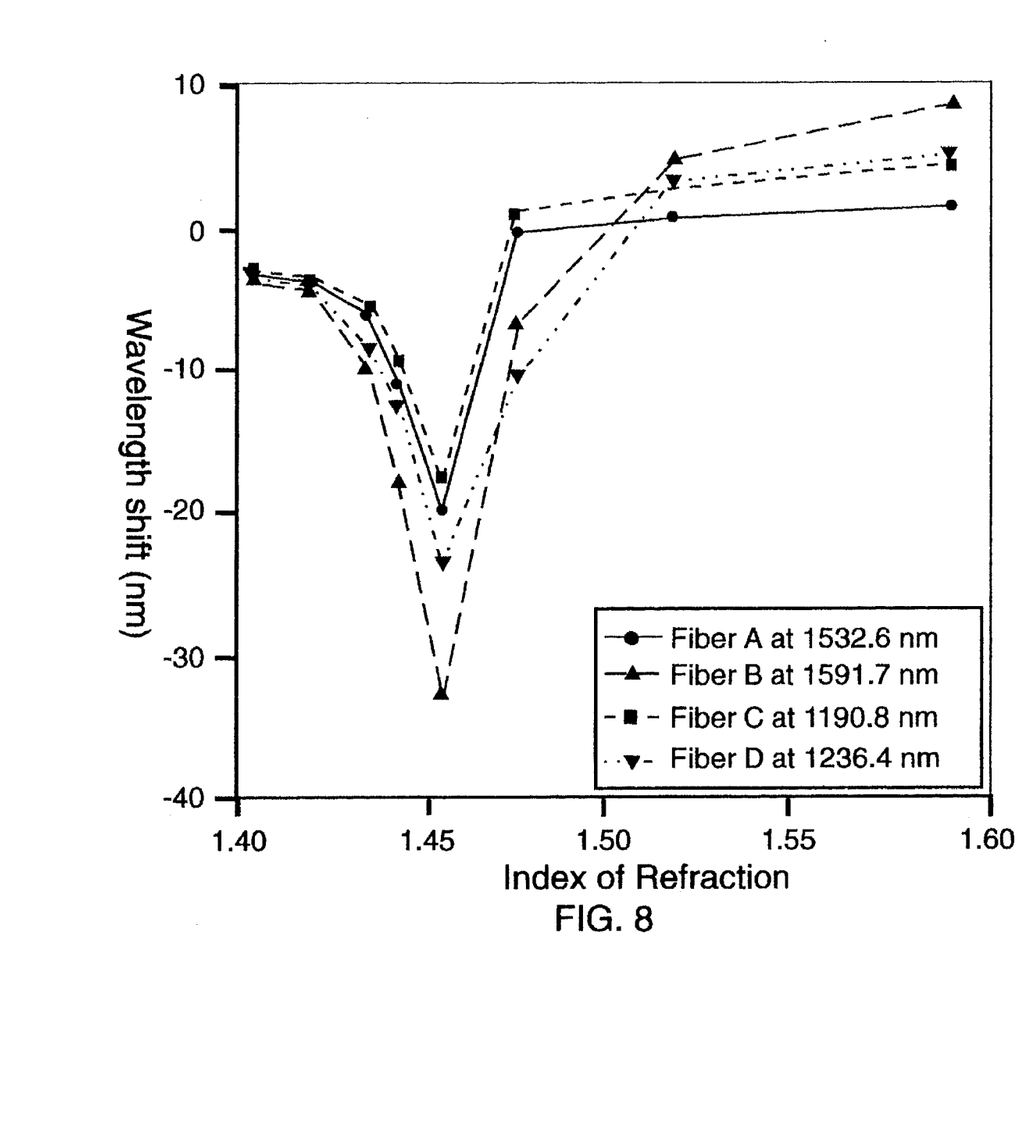
FIG. 8 is the wavelength transmission spectrum for refractive index.

To measure the refractive index sensitivity, the optical waveguide sensors were immersed in oils of known indices of refraction. It was observed that for all the long-period grating sensors tested, the coupling wavelength shifts to a lower value as the index of the ambient oil approaches that of glass. At this value the peak loss also dropped significantly and the grating was almost washed out. Presumably, this was due to the disappearance of the cladding modes owing to the loss of total internal reflection at the matched cladding-outer material interface. At indices larger than that of the cladding, the peak loss wavelength moves to higher values again. A single mode fiber at a wavelength of 0.98 μm was found to be most sensitive with a coupling wavelength shift of 31.1 nm for a refractive index variation of 0.048. This results in a refractive index resolution of $1.46 \times 10^{-4}$ for the optical spectrum analyzer employed to monitor shifts in the grating coupling wavelength as shown in FIG. 8.

Example 4

To analyze the bend sensitivity of long-period grating sensors, a long-period grating fabricated in a single mode dispersion-shifted fiber was epoxied to the middle of a flexible cantilever beam. One end of the beam was fixed while force was applied on the free end so that the optical waveguide sensor was bent.

Figure 9:
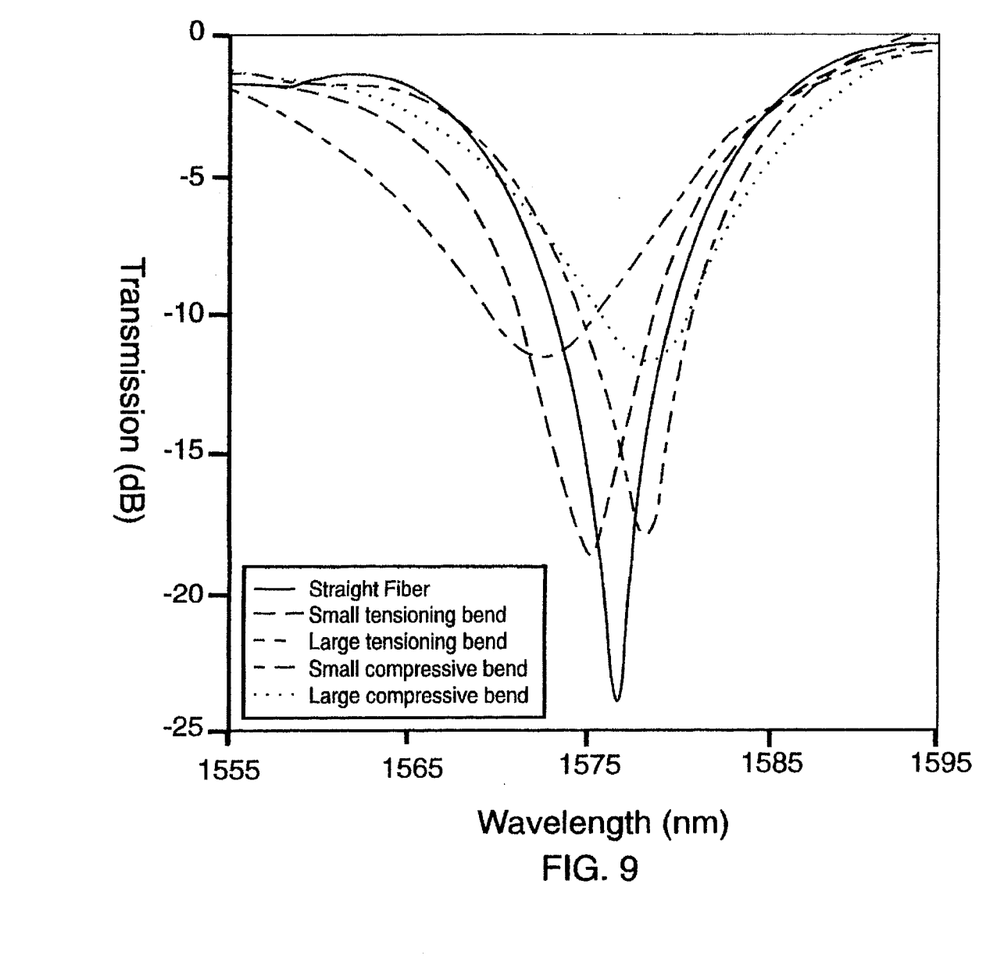
FIG. 9 is the wavelength transmission spectrum for bend sensitivity.

FIG. 9 illustrates the shift in the highest order coupling wavelength for both compressive and tensioning bends. For increasing bend magnitude the isolation reduces while the width of the attenuation band increases. The bend sensitivity of these sensors can be utilized to detect vibrations and motions in high-performance materials and structures. Because the mode conversion which occurs in a short period Bragg grating confines the light to the tightly confined guided modes of the fiber which travel close to the fiber neutral axis of the fiber, optical fiber Bragg gratings do not exhibit a significant response to bends. Hence, the long-period gratings we disclose here present an exciting new application for photoinduced grating-based sensors.

Example 5

Simultaneous measurement of multi-perturbations is critical in applications where different parameters have to be monitored over the lifetime of the sensor, or in situations where the output signal needs to be modified to compensate for the sensitivity to more than one external perturbation, or simply for distributed and localized sensing of a number of parameters. To monitor multiple parameters with a single long-period grating, one can monitor multiple attenuation bands in the transmission spectrum of the grating, each attenuation band corresponding to coupling of the guided mode to a different lossy non-guided mode. Assuming that the shift in the resonance bands is linear with the perturbations and that there is no cross-sensitivity between various parameters, the cumulative spectral displacement in the bands can be used to determine the concurrent perturbations. No corresponding scheme exists for measuring multiple environmental parameters using a single, short-period Bragg grating sensor since there is only one peak/dip in the reflection/transmission spectrum of the short-period Bragg grating sensor. For simultaneous measurement of temperature change, $\Delta T$, and strain, $\epsilon$, consider a long-period grating with A and B as the respective shifts per unit temperature/ strain change in the attenuation band centered at $\lambda_1$ and C and D as the corresponding temperature/strain sensitivity coefficients for the loss band at $\lambda_2$. Assuming that A, B ,C, and D are known, we can determine $\Delta T$ and s by solving the following simultaneous equation, $$\begin{bmatrix} A & B \\ C & D \end{bmatrix} \begin{bmatrix} \Delta T \\ \epsilon \end{bmatrix} = \begin{bmatrix} \Delta \lambda_1 \\ \Delta \lambda_2 \end{bmatrix}. \tag{2}$$

This sensing concept assumes that the elements of the sensitivity matrix (A, B, C, and D) are independent of the magnitude and polarity of any of the two concurrent perturbations, i.e., that there is no cross-sensitivity between the applied parameters and the shift in the attenuation band spectral locations is linear with both the perturbations. The dynamic range of the sensor can be severely limited if these conditions are not completely satisfied. Also, the robustness of this system to the inaccuracies in measurement of $\Delta\lambda_1$ and $\Delta\lambda_2$ is a function of the reciprocal of the condition number of the sensitivity matrix. The condition number of the matrix varies between zero and one and is defined as |S| |inv(S)|, where | | represents the matrix norm. To reduce inaccuracies introduced when measuring simultaneous environmental parameters with this scheme, the reciprocal of the matrix condition number should be close to one. Since the sensitivity matrix is dependent on the type of fiber in which the LPG is written, one can design fibers that possess a desired condition number and hence are less sensitive to errors in measurement process.

This scheme was used to determine strain and temperature acting simultaneously on a grating written in standard dispersion shifted fiber. Using this technique, strain and temperature changes were measured with resolutions of 250 μ$\epsilon$ (1 μ$\epsilon$=1×10$^{-6}$ strain) and 2° C., respectively. The same analysis was also extended to simultaneous measurement of strain and refractive index. The resolutions for these measurements were 250 μ$\epsilon$ and $3^* 10^{-4}$ for strain and refractive index, respectively. To our knowledge this is the first demonstration of an optical fiber sensor possessing versatility to measure more than one simultaneous pair of perturbations. By monitoring the shift in three or more attenuation bands simultaneous measurement of more than two parameters is also possible.

Long-period gratings are versatile sensing elements that can be configured for multi-parameter measurements. For applications that require sensing of a number concurrent perturbations, these gratings are an attractive alternative to other sensing systems that require a plurality of sensors to achieve the same objective. A number of long-period gratings can be multiplexed on the same fiber to implement a highly sensitive and accurate network of sensors in large civil structures.

What is claimed is:

1. An optical waveguide sensor arrangement for sensing at least one physical parameter, comprising:

an optical waveguide sensor having guided modes, lossy non-guided modes, and a long period grating coupling the guided modes to the lossy non-guided modes wherein the long period grating produces a wavelength transmission spectrum functionally dependent on the physical parameter sensed;

a source means for providing light to the optical waveguide sensor;

an optoelectronic detector positioned in an operable relationship to the optical waveguide sensor wherein the optoelectronic detector detects light transmitted through the optical waveguide sensor; and a processing means attached to the optoelectronic detector for correlating the wavelength transmission spectrum with a numerical value for the physical parameter sensed.

2. An optical waveguide sensor arrangement for sensing at least one physical parameter according to claim 1, wherein the optical waveguide sensor is an optical fiber sensor.

3. An optical waveguide sensor arrangement for sensing at least one physical parameter according to claim 1, wherein the optical waveguide sensor is attached to a structure.

4. An optical waveguide sensor arrangement for sensing at least one physical parameter according to claim 3, wherein the optical waveguide sensor is attached to the structure by embedding.

5. An optical waveguide sensor arrangement for sensing at least one physical parameter according to claim 1, wherein the physical parameter sensed is selected from the group consisting of: temperature, strain, shape, corrosion, and refractive index.

6. An optical waveguide sensor arrangement for sensing a plurality of physical parameters, comprising:

a plurality of optical waveguide sensors, each optical waveguide sensor having guided modes, lossy non-guided modes, and a plurality of long period gratings coupling the guided modes to the lossy non-guided modes wherein the long period gratings produce a wavelength transmission spectrum functionally dependent on the physical parameters sensed;

a means for coupling the optical waveguide sensors in series;

a source means for providing light to the plurality of optical waveguide sensors;

an optoelectronic detector, positioned in an operable relationship to the plurality of optical waveguide sensors, wherein the optoelectronic detector detects a plurality of light signals transmitted through the optical waveguide sensors;

a demultiplexing means, coupled to the optoelectronic detector, wherein the demultiplexing means discriminates amongst each of the light signals transmitted through the optical waveguide sensors; and a processing means, positioned in an operable relationship to the demultiplexing means, wherein the processing means correlates the wavelength transmission spectrum with a numerical value for each of the physical parameters sensed.

7. An optical waveguide sensor arrangement for sensing a plurality of physical parameters according to claim 6, wherein the optical waveguide sensor is an optical fiber sensor.

8. An optical waveguide sensor arrangement for sensing a plurality of physical parameters according to claim 6, wherein the optical waveguide sensor is attached to a structure.

9. An optical waveguide sensor arrangement for sensing a plurality of physical parameters according to claim 8, wherein the optical waveguide sensor is attached to the structure by embedding.

10. An optical waveguide sensor arrangement for sensing a plurality of physical parameters according to claim 6, wherein the physical parameter sensed is selected from the group consisting of: temperature, strain, shape, corrosion, and refractive index.

* * * * *